United States Patent [19]

Tsuruta et al.

[11] 4,455,884
[45] Jun. 26, 1984

[54] CHANGE SPEED TRANSMISSION FOR MOTORCYCLES

[75] Inventors: Kiyofumi Tsuruta; Yoshimi Osanai, both of Saitama; Takanori Onda, Kanagawa, all of Japan

[73] Assignee: Honda Giken Kogyo Kabushiki Kaisha, Tokyo, Japan

[21] Appl. No.: 346,895

[22] Filed: Feb. 8, 1982

[30] Foreign Application Priority Data

Feb. 18, 1981 [JP] Japan .................. 56-21375

[51] Int. Cl.³ ............................. F16H 57/06
[52] U.S. Cl. .................. 74/477; 74/337.5; 74/474
[58] Field of Search ........... 74/337.5, 474, 477, 74/476

[56] References Cited

U.S. PATENT DOCUMENTS 3,421,384 1/1969 Okamota et al. ............ 74/337.5 X
3,894,443 7/1975 Beig et al. .................... 74/477 X

FOREIGN PATENT DOCUMENTS 1147861 4/1963 Fed. Rep. of Germany .
1202665 10/1965 Fed. Rep. of Germany .
2826040 12/1979 Fed. Rep. of Germany .
137746 8/1982 Japan ............................ 74/477
128206 3/1920 United Kingdom .
863325 3/1961 United Kingdom .

Primary Examiner—Allan D. Herrmann
Attorney, Agent, or Firm—Lyon & Lyon

[57] ABSTRACT

A change speed transmission device using gears employs a shift drum mounted parallel to the driving and driven shafts. The shift drum is turned one-quarter revolution at a time to cause a shifting mechanism to produce a low speed drive, and an intermediate speed drive, and a high speed drive between the shafts, and then back to neutral. A pivoted pawl engages an abutment on the shaft drum to limit turning movement of the drum. An element frictionally engages a member fixed to rotate with the driven shaft and serves to bias the pawl to engage the abutment so that the shift drum is prevented from turning directly from a high speed shift position to a low speed shift position.

8 Claims, 5 Drawing Figures

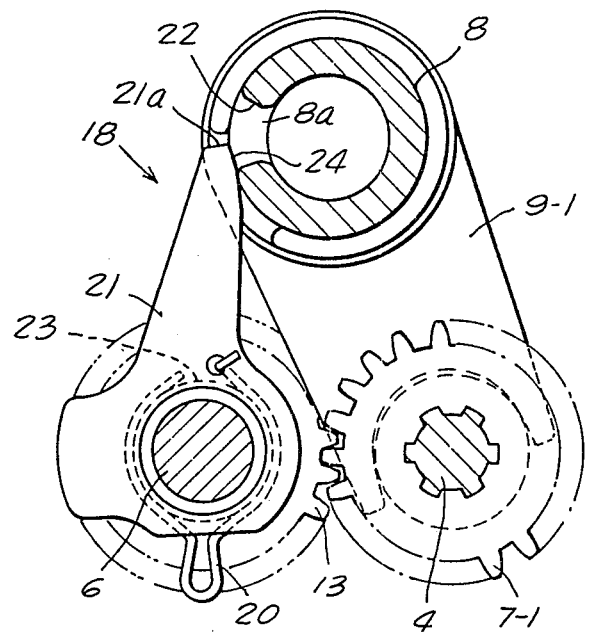
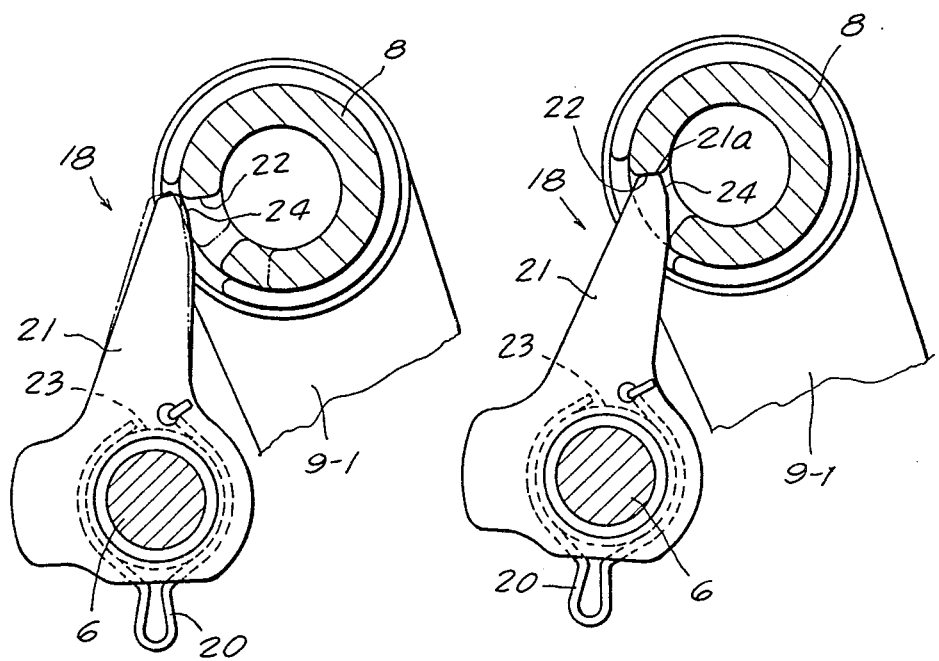

CHANGE SPEED TRANSMISSION FOR MOTORCYCLES

This invention relates to a change speed gear transmission for a motorcycle. Several speed ratios between the driving shaft and the driven shaft are provided, and a locking device is employed to prevent inadvertent shifting from the high speed gear train to the low speed gear train while the motorcycle is under way.

In accordance with this invention, a shift drum is mounted parallel to the input shaft and output shaft and is provided with cam means for shifting the elements of the gear drive trains to produce the desired speed ratio. A pivoted pawl is provided for cooperation with an abutment on the shift drum to limit angular movement of the shift drum and thereby prevent inadvertent shifting from the high speed drive train directly to the low speed drive train. The pawl is urged toward abutment engaging position by means of an element frictionally engaging one of the transmission parts which rotates in accordance with rotation of the output shaft. The element may comprise a spring which engages a groove in a side face of one of the gears that turns with the output shaft.

Other and more detailed objects and advantages will appear hereinafter.

In the drawings:

FIG. 3 is a sectional detail taken substantially on the lines 3—3 as shown on FIG. 1, and showing the locking parts in the high speed shift position.

FIGS. 4 and 5 are views similar to FIG. 3, partly broken away, and showing the locking parts in different positions.

Figure 1:
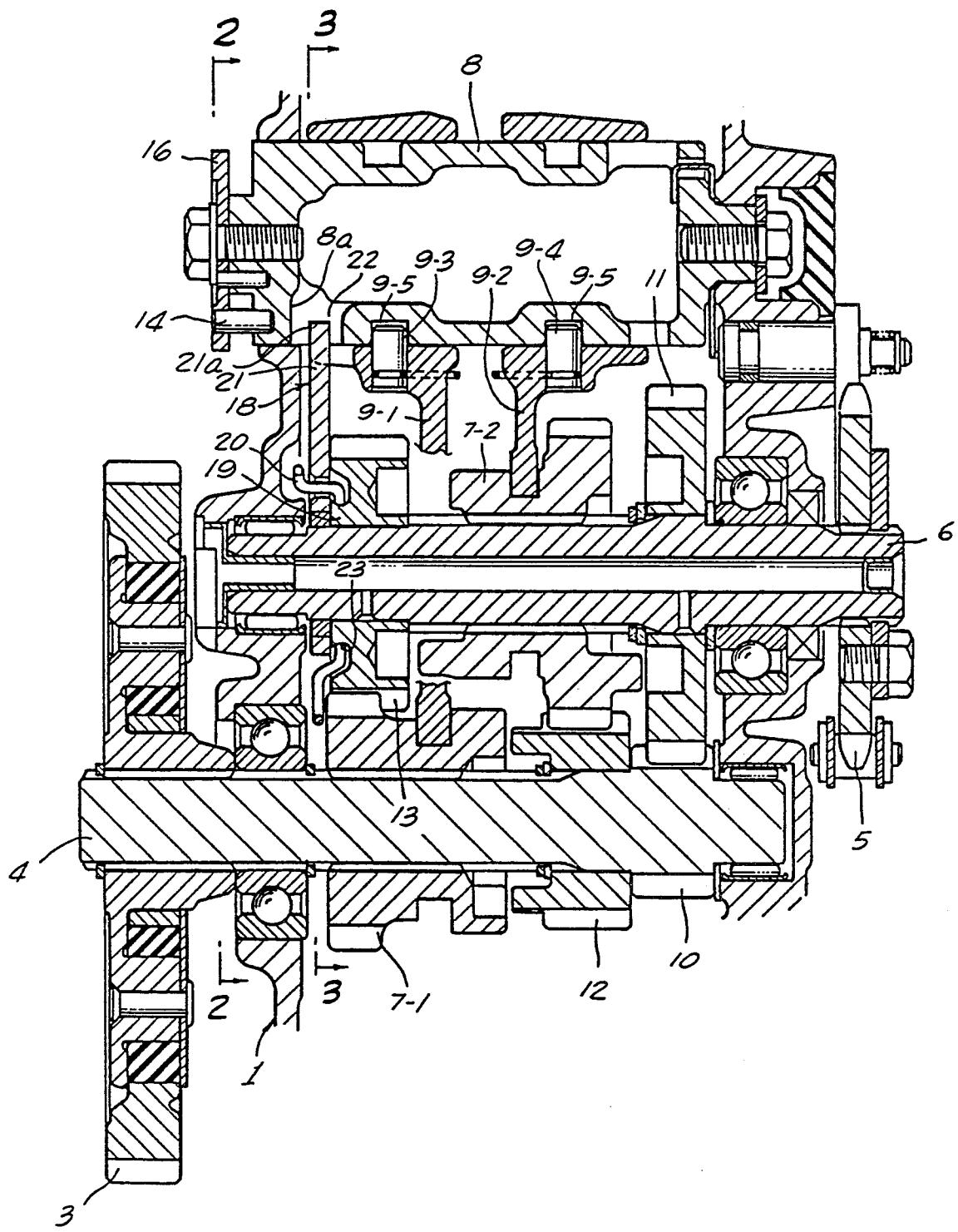
FIG. 1 is a sectional elevation showing a preferred embodiment of this invention.

Referring to the drawings, and particularly to FIG. 1 thereof, the transmission case 1 encloses the transmission mechanism which has an input shaft 4 and an output shaft 6. A driven gear 3 at one end of the input shaft 4 is connected through a clutch to an engine, not shown. The output shaft 6 has a sprocket 5 at one end thereof connected by chain to a driven sprocket, not shown.

A first shift gear 7-1 is keyed for axial movement on the input shaft 4 and a second shift gear 7-2 is keyed for axial movement on the output shaft 6. Axial sliding movement of the first shift gear 7-1 is accomplished by a first shift fork 9-1, and axial movement of the second shift gear 7-2 is accomplished by means of the second shift fork 9-2. The shift forks 9-1 and 9-2 are slidably mounted on the shift drum 8 which is parallel to the shafts 4 and 6. Radial pins 9-3 and 9-4 fixed on the shift forks travel in grooves 9-5 and 9-6 in the manner of a barrel cam and follower. The grooves have portions with axial lead components.

When the shift drum 8 is turned from the neutral position shown in FIG. 1 to the low speed ratio position, the second shift gear 7-2 slides axially to the right, as shown in FIG. 1, causing it to be coupled with the low speed driven gear 11 rotatably mounted on the output shaft 6. This driven gear 11 meshes with the low speed drive gear 10 fixed on the input shaft 4, thus accomplishing a low speed gear train from the input shaft 4 to the output shaft 6.

In the medium speed ratio position, the second shift gear 7-2 is returned to the neutral position and the first shift gear 7-1 is made to slide axially to the right to couple the first shift gear 7-1 to the medium speed drive gear 12 rotatably mounted on the input shaft 4, and in constant mesh with the second shift gear 7-2. This forms a medium speed gear train through gears 7-1, 12 and 7-2 between shafts 4 and 6.

In the high speed ratio position, the first shift gear 7-1 is returned to the neutral position and the second shift gear 7-2 is caused to slide axially to the left, whereby the second shift gear 7-2 is coupled with the high speed driven gear 13 rotatably mounted on the output shaft 6. The gear 13 is in constant mesh with the first shift gear 7-1, accomplishing a high speed gear train between the shafts 4 and 6.

Figure 2:
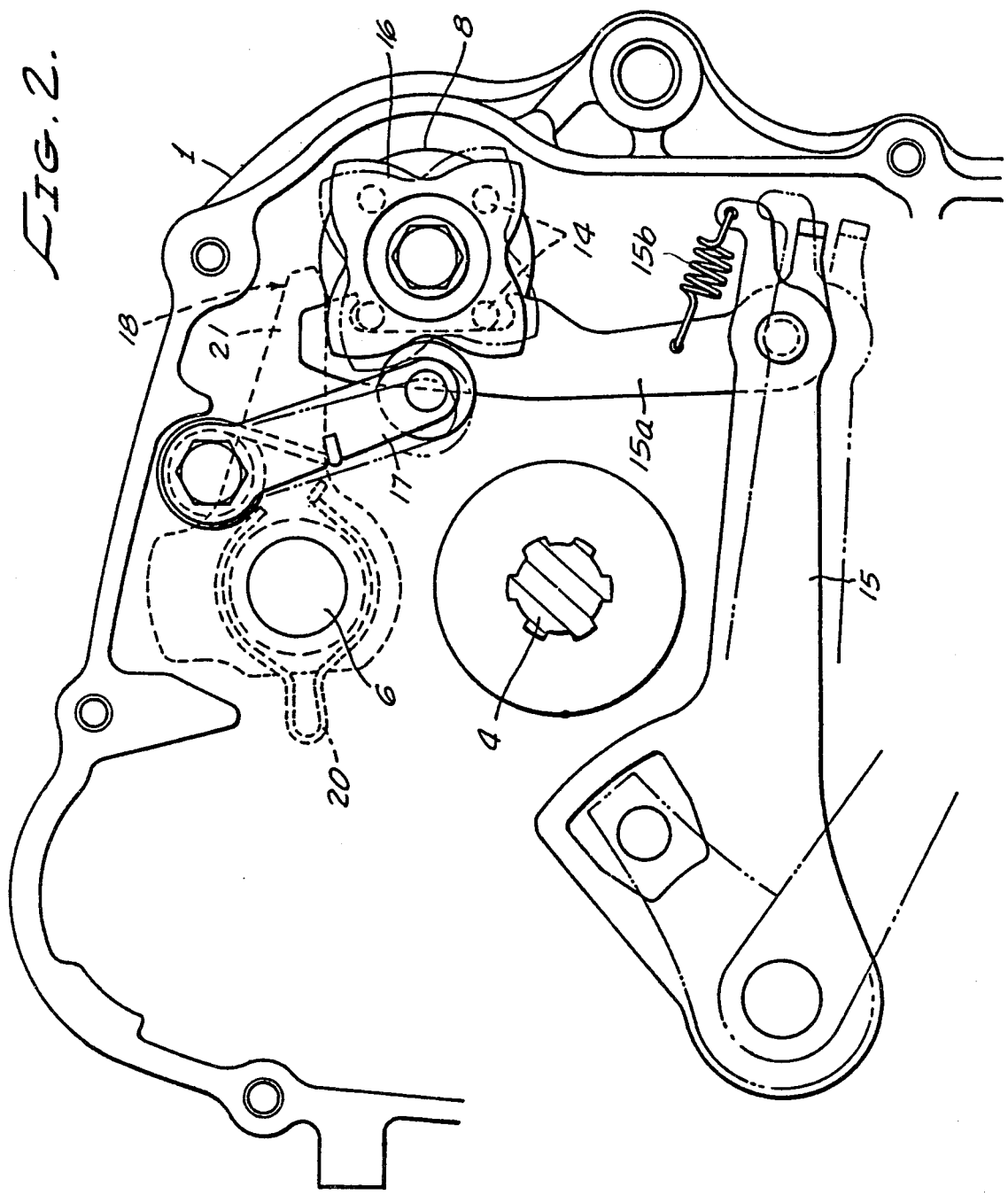
FIG. 2 is an end view taken substantially on the lines 2—2 as shown on FIG. 1.

The shift drum 8 is provided at its outer end with four axially extending pins 14 engageable with a pawl 15a, as shown in FIG. 2. The pawl 15a is pivotally mounted on the shift arm 15, and a spring 15b is provided to urge the pawl in clockwise direction to engage a pair of the pins 14. Counter-clockwise turning of the shift drum 8 one-quarter revolution at a time results from repeated operation of the shift arm 15. Counterclockwise motion of the shift drum 8, as viewed in FIG. 2, from the neutral position causes the shift drum 8 to turn sequentially to the low speed ratio position, then to the medium speed ratio position, then to the high speed ratio position, and then back to the neutral position. The cam plate 16 shown in FIGS. 1 and 2 turns with the shift drum 8 and operates in cooperation with a pivoted cam stopper 17 held resiliently in contact therewith, in order to stop the shift drum 8 resiliently at each of the four shift positions.

In accordance with this invention, a lock mechanism 18 is provided that operates by detecting rotary movement of the input shaft 4 of the transmission mechanism 2. The lock mechanism when actuated prevents the shift drum 8 from turning from the high speed shift position directly to the low speed shift position. The lock mechanism 18 includes a spring member 20 frictionally engaged with a rotating member 19 that turns in timed relationship with the input shaft 4. A lock piece 21 is mounted for relative turning movement on the output shaft 6, and is moved by friction drag of the spring 20 with the rotating member 19 to move the lock piece 21 clockwise, as viewed in the drawings, to bring its surface 24 into contact with the peripheral surface of the shift drum 8.

The rotating member 19 may be provided separately, if desired. However, it is preferred to employ the side face of a gear in one of the gear trains as a rotating member. The spring 20 has friction contact in a groove 23 formed in the side face of the gear 13. This construction is advantageous in reducing the axial length of the system.

An opening 8a in the periphery of the shift drum 8 is provided with an end wall 22 which may be engaged by the shoulder 21a on the lock piece 21. This engagement occurs only when an attempt is made to shift the drum 8 from the high speed position shown in FIG. 3 to the low speed position while the vehicle is moving. Movement of the vehicle under the high speed shift position causes the spring 20 to apply a clockwise torque to the lock piece 21 as viewed in FIG. 3. Movement of the shift drum 8 under such conditions toward the low speed position is prevented by movement of the lock piece 21 clockwise and to the opening 8a to bring the shoulder 21a into engagement with the end wall 22, as shown in FIG. 5. Accordingly, when the vehicle is moving and with the shift drum 8 in the high speed position, a downshift may be accomplished to the medium speed position but not to the low speed position. When the shift pedal is released the drum is blocked, the shift drum 8 is returned to the high speed shift position by resilient force of the cam stopper 17 acting on the cam plate 16 at the outer end of the shift drum 8.

The vehicle is stopped by means of brakes on the wheels thereby controlling rotation of the output shaft 6 and the input shaft 4. The lock piece 21 is therefore released from the clockwise torque. Because the resilient force of the cam stopper 17 returns the cam plate 16 to the high gear position any time a shift is blocked by the lock piece 21, the lock piece 21 rides outwardly from the opening 8a in the shift drum 8 with the surface 24 being in contact with the surface of the shift drum 8 as the drum 8 rotates back to the high gear position. In this way the lock mechanism is in an inoperative position wherein the lock piece 21 does not move into the opening 8a on the shift drum 8. The shift drum 8 may then be turned from the high speed shift position to the neutral position.

It will be noted that the gear 12 is not constantly coupled with the input shaft 4, yet it is constantly coupled with the output shaft 6 and is at all times rotated during running of the vehicle, so that it is possible to detect running conditions of the vehicle by detecting rotation of the gear 12, and thus to give the lock mechanism 18 the required operation.

As is seen from the foregoing, in accordance with this invention, a lock mechanism is provided that operates by rotation of the input shaft of the transmission mechanism so as to check the turning of the shift drum from the high speed shift position to the low speed shift position, thereby being effective to prevent sudden downshift as a result of erroneous operation during running.

Having fully described our invention, it is to be understood that we are not to be limited to the details herein set forth, but that our invention is of the full scope of the appended claims.

We claim:

1. In a change speed transmission device having an input shaft, an output shaft, and means including gear means for driving the output shaft from the input shaft at any one of a plurality of speed ratios, the improvement comprising, in combination: a shift drum mounted parallel to the shafts and provided with an abutment, means for turning said shift drum, means operated by turning movement of shift drum to select a desired speed ratio between the shafts, a pivoted pawl engageable with said abutment to limit turning movement of said shift drum, a member fixed to rotate with one of the shafts, means frictionally engaging said member for biasing said pawl to engage said abutment, whereby said shift drum is prevented from turning directly from a high speed shift position to a low speed shift position.

2. The combination set forth in claim 1 wherein said member comprises a gear forming a part of said gear means.

3. The combination set forth in claim 1 wherein said abutment comprises a wall of a recess provided on said shift drum.

4. In a change speed transmission device having an input shaft, an output shaft, and means including gears for driving the output shaft from the input shaft at any one of a plurality of speed ratios, the improvement comprising, in combination: a shift drum mounted parallel to the shafts and provided with a peripheral recess having one wall forming an abutment, means for turning said shift drum, means operated by turning movement of shift drum to select a desired speed ratio between the shafts, a pivoted pawl engageable with said abutment to limit turning of said shift drum, one of the gears being fixed to rotate with one of the shafts, an element frictionally engaging the latter said gear for biasing said pawl to engage said abutment, whereby said shift drum is prevented from turning directly from a high speed shift position to a low speed shift position.

5. In a change speed transmission device having a rotatably mounted input shaft, a rotatably mounted output shaft, and gearing for driving the output shaft from the input shaft at any one of the plurality of speed ratios, the improvement comprising, in combination: a rotatably mounted shift drum having an abuttment thereon, shift linkage extending from said shift drum to said gearing for selecting any one of the plurality of speed ratios, a pawl engagable with said abuttment to limit turning movement of said shift drum and means for sensing movement of said output shaft and selectably biasing said pawl to engage said abuttment, said means for sensing movement of said output shaft and selectably biasing said pawl including an element frictionally coupled with said output shaft and directly coupled to said pawl.

6. The combination set forth in claim 5 wherein said element includes a spring.

7. The combination set forth in claim 5 wherein said pawl is pivotally mounted in the transmission, said shift drum being mounted parallel to the output shaft.

8. The combination set forth in claim 5 wherein said element frictionally engages a member of the gearing mounted to the output shaft.

* * * * *